Patented Mar. 19, 1946

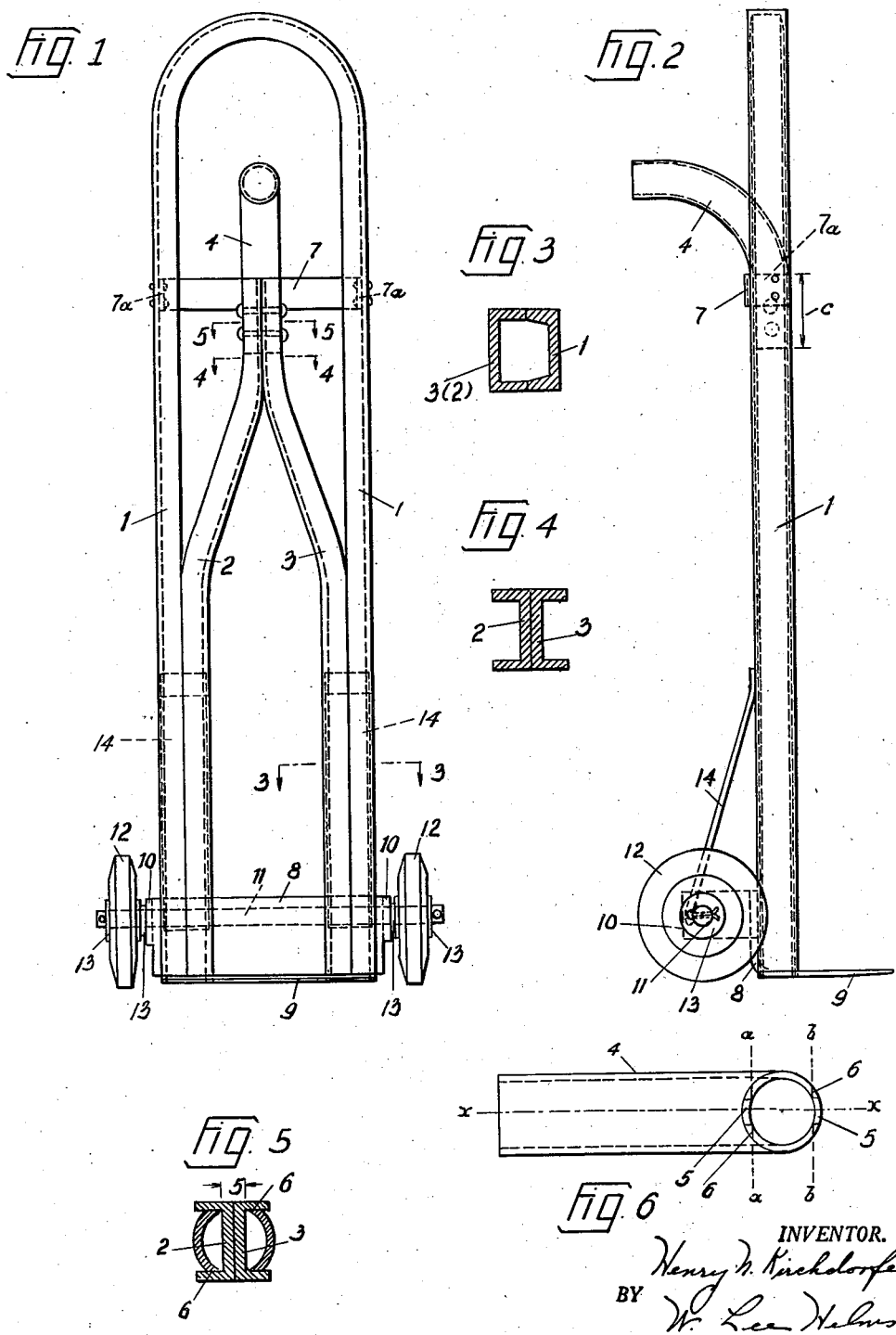
March 19, 1946. H. N. KIRCHDORFER 2,396,953
HAND TRUCK
Filed Sept. 7, 1944

2,396,953

UNITED STATES PATENT OFFICE 2,396,953

HAND TRUCK

Henry N. Kirchdorfer, Louisville, Ky.

Application September 7, 1944, Serial No. 553,012

8 Claims. (Cl. 280—56)

This invention relates to hand trucks of the type commonly used in handling trunks, baggage, barrels and other goods. The object of the invention is to provide a hand truck which shall be extremely light in weight yet sufficiently strong for the heaviest loads required to be carried. An important object is to provide an extremely light-weight hand truck which will not be warped out of shape by rough usage and heavy and awkward loads. A further object is to provide a hand truck of relatively few parts, and more particularly, parts which can be readily formed from standard stock such as flat plate, structural shapes and tubing. A still further object of invention is to provide a hand truck which can be manufactured at extremely low cost. For the attainment of the foregoing and such other objects as may appear or be pointed out herein I have shown an embodiment of my invention in the accompanying drawing, wherein:

Fig. 1 is a front view of the hand truck;

Fig. 2 is a side view thereof;

Fig. 3 is a cross-section (enlarged) on line 3—3 of Fig. 1, through the main outer frame at the lower portion of the truck;

Fig. 4 is a cross-section (enlarged) on line 4—4 of Fig. 1, through the inner central frame below the point at which the tubular hand-grip is secured thereto;

Fig. 5 is a cross-section (enlarged) on line 5—5 of Fig. 1, through the inner central frame, similar to Fig. 4 except that the section is taken at a higher point where the tubular hand-grip is secured to the inner central frame; and Fig. 6 is a plan view (enlarged) of the pipe bend or hand-grip, showing the machining of one end thereof.

The main or outer frame of the truck is formed from a channel beam, preferably of a light-weight material such as aluminum. Channel structural member 1 is bent upon itself in the shape of an inverted U, with the curved portion of the U-shape forming the top of the truck and with the legs of the U-shape forming the parallel sides of the truck. U-shaped channel member 1 is bent with the web of the channel faced outward and with its two flanges inwardly. The lower portions of the parallel sides of channel frame 1 is reinforced by inner channel members. The left side of the truck frame is reinforced by a left inner channel member 2, while the right side of the truck frame is reinforced by a right inner channel member 3. Inner channel members 2 and 3 are disposed with their webs faced inwardly or towards each other. The left inner channel 2 is offset to present a lower portion at its left which is in juxtaposition with the lower left leg of the outer channel frame 1 and to present an upper portion at its right which is in juxtaposition with the longitudinal central axis of the truck. The right inner channel 3, on the other hand, is offset to present a lower portion at its right which is in juxtaposition with the lower right leg of the outer channel frame 1.

By reason of the fact that the web of outer channel frame 1 is faced outwardly while the webs of the inner channel members 2 and 3 are faced inwardly, the flanges of the outer channel 1 touch the flanges of the inner channels 2 and 3, all channel members being of the same structural size. As a result, the outer channel 1 which constitutes the left leg of the frame forms with the leftwardly offset portion of the left inner channel 2, a square structural frame, see Fig. 3, while the right leg of outer channel 1 forms with the rightwardly offset portion of the right inner channel 3, a similar square structural outline, shown also in Fig. 3. The flanges of the opposed outer and inner channel members 1 and 2 and 1 and 3 are welded to form a strong square-shaped frame along the bottom portions of the sides of the truck. On the other hand, the rightwardly offset upper portion of left inner channel 2 and the leftwardly offset upper portion of the right inner channel 3 together form an I-shaped structural member, see Fig. 4, with the webs of the two inner channel members back to back and welded together.

The hand-grip is made from a length of pipe or tube 4 bent in the shape of a quadrant of a circle. One end of hand tube 4 projects rearwardly of the truck, Fig. 2 with its other end secured to the upper end of inner channels 2 and 3. To fit the end of tube 4 to channels 2 and 3, that end of the tube is milled or otherwise machined along two lines $a$—$a$ and $b$—$b$, Fig. 6 which are parallel to each other and normal to the longitudinal axis $x$—$x$ of the pipe bend. As a result of this machining, which extends for a distance $c$, see Fig. 2, two aligned slits 5 are formed in the end of the tube, each located on the longitudinal axis $x$—$x$ and each centrally located on two parallel surfaces 6. Aligned slits 5 are sufficiently wide to permit the machined end of pipe bend 4 to be placed on the upper end of the I-shaped frame composed of the two inner channel members 2 and 3 with the back-to-back webs of the two channels clearing through aligned slits 5. The distance between the two parallel machined surfaces 6 is such that these surfaces fit against the inside of the flanges of the channel members. The pipe bend 4 is riveted, welded, bolted or otherwise secured to the composite channel frame 2—3.

The upper portions of outer frame 1 may be reinforced as by a brace strap 7 having flanges 7a at both ends fitting within the channel member 1 to which it is secured by riveting, welding, bolting or other fastening means.

The bottom structure of the improved truck is fabricated from a single metal plate which is cut out from the sheet to a predetermined configuration. The cut plate is given a longitudinal bend to form a back-stop 8 and a bottom rest 9, substantially normal to one another, Fig. 2, with the back-stop 8 secured to the lower portions of the outer frame and with the bottom rest 9 projecting forwardly, Fig. 2. The said cut plate has two end extensions which are bent to form an ear 10 at each end of back-stop 8 projecting rearwardly. Parallel ear projections 10 serve to support a horizontal spindle 11, being provided with apertures therefor. Spindle 11 extends beyond ear projections 10 where their end extensions serve as supports for wheels 12 which are rotatively mounted on spindle 11 and spaced from ear projections 10 by washers 13. Washers 13 are also provided at the ends of the spindle, the wheel and washer assemblage being held in place by cotter pins or other securement means. The spindle 11 may be braced by a pair of brace straps 14, associated with each side of the truck frame. Brace strap 14 is secured, by riveting or welding, to the respective frame leg and is bent rearwardly, see Fig. 2, with its rearwardly disposed distal end secured to spindle 11, as by bolt or rivet or the like.

I claim:

1. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, a length of pipe having a substantially 90° bend, one end of the said pipe bend being machined in a direction normal to its longitudinal axis to provide a pair of parallel surfaces with a pair of aligned slits lying on the said longitudinal axis, the said pair of aligned slits being sufficiently wide to permit the machined end of the pipe bend to be affixed to the said upper end of the I-shaped central frame with the said facing webs of the inner channel members clearing in the said aligned slits, the distance between the said pair of parallel machined surfaces of the pipe end being somewhat less than the inside dimension between flanges of the channel members so that the said parallel machined surfaces fit against the said inside flanges of the channel members, the said machined ends of the pipe bend being secured to the said I-shaped central frame with the other end projecting rearwardly of the truck to serve as a hand-grip, a sheet of metal plate cut to predetermined configuration including a pair of longitudinally projecting portions, the said plate being bent longitudinally substantially 90° to form a back-stop and a bottom rest, the said back-stop being secured to the lower portions of the said pair of outer frame legs with the said bottom rest projecting forwardly of the truck, the said pair of longitudinally projecting portions being bent 90° rearwardly to form lateral ears, each of the said rearwardly extending lateral ears having an aperture, a spindle passed through the said apertures of the lateral ears and projecting outwardly thereof, a pair of wheels each rotatively mounted on the said outwardly projecting ends of the said spindle, and a pair of straps each secured at its upper portion to respective ones of the said pair of outer frame legs and offset rearwardly to bring the distal ends of the said straps in contact with the said spindle, the said contacted end portions of the straps being secured to the said spindle.

2. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, a length of pipe having a substantially 90° bend, one end of the said pipe bend being machined in a direction normal to its longitudinal axis to provide a pair of parallel surfaces and a pair of aligned slits lying on the said longitudinal axis, the said pair of aligned slits being sufficiently wide to permit the machined end of the pipe bend to be affixed to the said upper end of the I-shaped central frame with the said facing webs of the inner channel members clearing in the said aligned slit, the distance between the said pair of parallel machined surfaces of the pipe end being somewhat less than the inside dimension between flanges of the channel members so that the said parallel machined surfaces fit against the said inside flanges of the channel members, the said machined end of the pipe bend being secured to the said I-shaped central frame with the other end projecting rearwardly of the truck to serve as a hand-grip, a sheet of metal plate cut to predetermined configuration including a pair of longitudinally projecting portions, the said plate being bent longitudinally substantially 90° to form a back-stop and a bottom rest, the said back-stop being secured to the lower portions of the said pair of outer frame legs with the said bottom rest projecting forwardly of the truck, the said pair of longitudinally projecting portions being bent 90° rearwardly to form lateral ears, the said rearwardly extending lateral ears having an aperture, a stationary spindle passed through the said apertures of the lateral ears and projecting outwardly thereof, and a pair of wheels each rotatively mounted on the said outwardly projecting ends of the said spindle.

3. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, a length of pipe having a substantially 90° bend, one end of the said pipe bend being machined in a direction normal to its longitudinal axis to provide a pair of parallel surfaces and a pair of aligned slits lying on the said longitudinal axis, the said pair of aligned slits being sufficiently wide to permit the machined end of the pipe bend to be affixed to the said upper end of the I-shaped central frame with the said facing webs of the inner channel members clearing in the said aligned slits, the distance between the said pair of parallel machined surfaces of the pipe end being somewhat less than the inside dimension between flanges of the channel members so that the said parallel machined surfaces fit against the said inside flanges of the channel members, the said machined end of the pipe bend being secured to the said I-shaped central frame with the other end projecting rearwardly of the truck to serve as a hand-grip, a sheet of metal plate cut to predetermined configuration including a pair of longitudinally projecting portions, the said plate being bent longitudinally substantially 90° to form a back-stop and a bottom rest, the said back-stop being secured to the lower portions of the said pair of outer frame legs with the said bottom rest projecting forwardly of the truck, the said pair of longitudinally projecting portions being bent 90° rearwardly to form lateral ears, and a pair of wheels each rotatively mounted on the said rearwardly projecting lateral ears.

4. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, a length of pipe having a substantially 90° bend, one end of the said pipe bend being machined in a direction normal to its longitudinal axis to provide a pair of parallel surfaces and a pair of aligned slits lying on the said longitudinal axis, the said pair of aligned slits being sufficiently wide to permit the machined end of the pipe bend to be affixed to the said upper end of the I-shaped central frame with the said facing webs of the inner channel members clearing in the said aligned slits, the distance between the said pair of parallel machined surfaces of the pipe end being somewhat less than the inside dimension between flanges of the channel members so that the said parallel machined surfaces fit against the said inside flanges of the channel members, the said machined end of the pipe bend being secured to the said I-shaped central frame with the other end projecting rearwardly of the truck to serve as a hand-grip, a sheet of metal plate cut to predetermined configuration and bent longitudinally substantially 90° to form a back-stop and a bottom rest, the said back-stop being secured to the lower portions of the said pair of outer frame legs with the said bottom rest projecting forwardly of the truck.

5. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, and a length of pipe having a substantially 90° bend, one end of the said pipe bend being machined in a direction normal to its longitudinal axis to provide a pair of parallel surfaces and a pair of aligned slits lying on the said longitudinal axis, the said pair of aligned slits being sufficiently wide to permit the machined end of the pipe bend to be affixed to the said upper end of the I-shaped central frame with clearance of the said facing webs of the inner channel members, the distance between the said pair of parallel machined surfaces of the pipe end being somewhat less than the inside dimension between flanges of the channel members so that the said parallel machined surfaces fit against the said inside flanges of the channel members, the said machined end of the pipe bend being secured to the said I-shaped central frame with the other end projecting rearwardly of the truck to serve as a hand-grip.

6. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped outer frame legs, the said facing webs of the pair of inner channel members being welded together to form an I-shaped central frame terminating near the said curved top of the outer channel member, a length of pipe having a substantial 90° bend, one end of the said pipe bend being secured to the said I-shaped central frame with the other end projecting rearwardly of the truck to serve as a hand-grip.

7. A hand truck comprising, in combination, an outer channel member bent in inverted U-shape with its web faced outwardly, a pair of inner channel members offset oppositely to one another to dispose the upper portion of both members in juxtaposition along the central longitudinal axis of the truck and to dispose the lower portions of the members in juxtaposition with lower portions of the respective legs of the said outer channel member, the webs of said pair of inner channel members facing inwardly and the opposed flanges of the outer channel member and the respective one of the said pair of inner channel members being welded together to form a pair of square-shaped tubular outer frame legs, the said facing webs of the pair of inner channel members being welded together to form an I-shaped central frame terminating below the said curved top of the outer channel member, and a narrow strip spanned across the said outer channel member below its said curved top to brace the sides thereof.

8. A hand truck comprising, in combination, an outer frame defining the outlines of the truck, an inner rib centrally located on the longitudinal axis of the said outer frame extending a short length thereof and terminating below the top of the outer frame, said outer frame and central rib being fabricated of inter-connected structural elements, a length of pipe having a substantially 90° bend affixed at one end to the upper terminus of the said central rib with the other end projecting rearwardly of the truck to serve as a hand-grip, a sheet of metal plate cut to predetermined configuration including a pair of end portions, the said plate being bent longitudinally substantially 90° to form a back-stop and a bottom rest, the said back-stop being secured to the lower portions of the said outer frame with the said bottom rest projecting forwardly of the truck, the said pair of end portions being bent 90° rearwardly to form lateral ears, and a pair of wheels each rotatively mounted on the said lateral ears.

HENRY N. KIRCHDORFER.